(12) United States Patent  
Meade et al.

(10) Patent No.: US 9,804,350 B2  
(45) Date of Patent: Oct. 31, 2017

(54) METHOD OF FORMING A HERMETICALLY SEALED FIBER TO CHIP CONNECTIONS

(71) Applicant: Micron Technology, Inc., Boise, ID (US)

(72) Inventors: Roy Meade, Boise, ID (US); Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/091,439

(22) Filed: Apr. 5, 2016

(65) Prior Publication Data

US 2016/0216465 A1 Jul. 28, 2016

Related U.S. Application Data

(62) Division of application No. 13/543,156, filed on Jul. 6, 2012, now Pat. No. 9,329,336.

(51) Int. Cl.
| | |
|---|---|
| *G02B 6/42* | (2006.01) |
| *G02B 6/30* | (2006.01) |
| *G02B 6/12* | (2006.01) |
| *G02B 6/25* | (2006.01) |
| *G02B 6/255* | (2006.01) |
| *G02B 6/26* | (2006.01) |

(52) U.S. Cl.  
CPC .......... *G02B 6/4251* (2013.01); *G02B 6/12* (2013.01); *G02B 6/25* (2013.01); *G02B 6/255* (2013.01); *G02B 6/262* (2013.01); *G02B 6/305* (2013.01); *G02B 6/424* (2013.01)

(58) Field of Classification Search  
CPC .......... G02B 6/4251; G02B 6/12; G02B 6/25; G02B 6/255; G02B 6/262; G02B 6/305; G02B 6/424  
See application file for complete search history.

(56) References Cited

U.S. PATENT DOCUMENTS

| | | | | | |
|---|---|---|---|---|---|
| 3,788,827 | A | * | 1/1974 | DeLuca | C03B 37/14 385/123 |
| 4,652,323 | A | * | 3/1987 | Butt | G02B 6/4416 156/294 |
| 4,785,805 | A | * | 11/1988 | Joffe | A61B 18/20 606/15 |

(Continued)

FOREIGN PATENT DOCUMENTS

| | | |
|---|---|---|
| CN | 101371175 A | 2/2009 |
| CN | 101533128 B | 11/2010 |

(Continued)

OTHER PUBLICATIONS

Anatol Khilo et al., "Efficient Planar Single Mode Fiber-to-Chip Coupler Based on Two-Stage Adiabatic Evolution", Conferences on Lasers and Electro-Optics (CLEO) and Quantum Electronics and Laser Science Conference (ELS), May 16, 2010, pp. 1-2.

(Continued)

*Primary Examiner* — Peter Radkowski  
(74) *Attorney, Agent, or Firm* — Perkins Coie LLP

(57) ABSTRACT

Disclosed are methods of providing a hermetically sealed optical connection between an optical fiber and an optical element of a chip and a photonic-integrated chip manufactured using such methods.

14 Claims, 5 Drawing Sheets

(56) References Cited

U.S. PATENT DOCUMENTS

| | | | | |
|---|---|---|---|---|
| 5,002,359 | A * | 3/1991 | Sayegh | G02B 6/443 385/107 |
| 5,074,638 | A * | 12/1991 | Poli | G02B 6/3817 385/50 |
| 6,043,294 | A * | 3/2000 | Hed | B01J 19/122 204/157.15 |
| 6,180,496 | B1 * | 1/2001 | Farrens | H01L 21/187 257/E21.088 |
| 6,216,939 | B1 | 4/2001 | Thackara et al. | |
| 6,238,078 | B1 * | 5/2001 | Hed | B01J 19/122 362/556 |
| 6,355,301 | B1 * | 3/2002 | Miller | C03C 17/10 427/163.2 |
| 6,486,008 | B1 * | 11/2002 | Lee | H01L 21/76254 257/E21.568 |
| 6,498,369 | B1 * | 12/2002 | Yamazaki | G02F 1/13454 257/347 |
| 6,576,313 | B2 * | 6/2003 | Iio | B32B 1/08 156/272.2 |
| 6,643,446 | B2 | 11/2003 | Moidu et al. | |
| 6,764,550 | B2 * | 7/2004 | Kang | H01J 37/32935 118/712 |
| 7,261,793 | B2 * | 8/2007 | Chen | H01L 24/83 156/272.2 |
| 7,415,184 | B2 * | 8/2008 | Ghiron | G02B 6/4231 385/129 |
| 7,419,884 | B2 * | 9/2008 | Kerdiles | H01L 21/76254 257/E21.331 |
| 7,572,070 | B2 | 8/2009 | Sasaki et al. | |
| 7,601,271 | B2 * | 10/2009 | Kerdiles | C03C 27/00 156/60 |
| 7,611,974 | B2 * | 11/2009 | Letertre | H01L 21/02381 257/183 |
| 7,781,300 | B2 * | 8/2010 | Moriceau | H01L 21/76224 257/E21.564 |
| 7,863,650 | B2 * | 1/2011 | Letertre | H01L 21/02381 257/189 |
| 8,091,601 | B2 * | 1/2012 | Kerdiles | C03C 27/00 156/349 |
| 8,091,764 | B2 * | 1/2012 | Suga | B23K 20/023 228/116 |
| 8,300,312 | B2 * | 10/2012 | Kobayashi | G02B 27/286 359/485.04 |
| 2001/0037997 | A1 * | 11/2001 | Barnett | B23K 10/02 219/121.48 |
| 2002/0005574 | A1 * | 1/2002 | Zhou | G02B 6/4248 257/680 |
| 2002/0072157 | A1 * | 6/2002 | Jinno | H01L 27/1214 438/158 |
| 2002/0097975 | A1 * | 7/2002 | Delpoux | G02B 6/3636 385/137 |
| 2002/0164489 | A1 * | 11/2002 | Iio | B32B 1/08 428/475.2 |
| 2002/0170496 | A1 * | 11/2002 | Ha | B05D 1/62 118/718 |
| 2002/0170877 | A1 * | 11/2002 | Fazio | C03C 25/6293 216/24 |
| 2002/0176668 | A1 | 11/2002 | Rubino et al. | |
| 2003/0047137 | A1 * | 3/2003 | Kang | H01J 37/32935 118/713 |
| 2003/0068449 | A1 * | 4/2003 | Steinberg | B05D 1/62 427/569 |
| 2003/0094443 | A1 * | 5/2003 | Barnett | B23K 10/022 219/121.46 |
| 2004/0058476 | A1 * | 3/2004 | Enquist | B81C 1/00269 438/114 |
| 2005/0078920 | A1 | 4/2005 | Lee et al. | |
| 2005/0102025 | A1 * | 5/2005 | Laroche | A61L 33/0011 623/1.46 |
| 2006/0032582 | A1 * | 2/2006 | Chen | H01L 24/83 156/272.6 |
| 2006/0033188 | A1 * | 2/2006 | Chen | H01L 24/83 257/678 |
| 2006/0240642 | A1 * | 10/2006 | Kerdiles | H01L 21/76254 438/455 |
| 2007/0023850 | A1 * | 2/2007 | Chen | H01L 21/187 257/414 |
| 2007/0023904 | A1 | 2/2007 | Salmon et al. | |
| 2007/0119812 | A1 * | 5/2007 | Kerdiles | C03C 27/00 216/34 |
| 2007/0202660 | A1 * | 8/2007 | Moriceau | H01L 21/76254 438/424 |
| 2007/0274630 | A1 * | 11/2007 | Ghiron | G02B 6/4231 385/33 |
| 2008/0191239 | A1 * | 8/2008 | Letertre | H01L 21/02381 257/183 |
| 2009/0017222 | A1 * | 1/2009 | Dornfest | C23C 16/0272 427/535 |
| 2009/0032831 | A1 * | 2/2009 | Akiyama | G02B 6/132 257/98 |
| 2009/0081424 | A1 * | 3/2009 | Gomi | H03H 3/02 428/195.1 |
| 2009/0081848 | A1 * | 3/2009 | Erokhin | H01J 37/20 438/455 |
| 2009/0261064 | A1 * | 10/2009 | Kerdiles | C03C 27/00 216/34 |
| 2009/0294072 | A1 * | 12/2009 | Kerdiles | C03C 27/00 156/380.9 |
| 2010/0006857 | A1 * | 1/2010 | Letertre | H01L 21/02381 257/76 |
| 2010/0032081 | A1 * | 2/2010 | Green | B29C 47/0014 156/219 |
| 2010/0092786 | A1 * | 4/2010 | Utsumi | B23K 20/02 428/433 |
| 2010/0101719 | A1 * | 4/2010 | Otsuka | C03C 27/06 156/272.6 |
| 2010/0134885 | A1 * | 6/2010 | Kobayashi | G02B 27/286 359/485.03 |
| 2010/0155803 | A1 * | 6/2010 | Sandhu | H01L 21/84 257/310 |
| 2011/0007998 | A1 * | 1/2011 | Yamamoto | G02B 6/138 385/14 |
| 2012/0006468 | A1 * | 1/2012 | Stopford | G02B 6/4402 156/175 |
| 2012/0262674 | A1 * | 10/2012 | Kawase | G02B 5/3033 353/20 |

FOREIGN PATENT DOCUMENTS

| | | | | |
|---|---|---|---|---|
| EP | 0515784 | A2 | 12/1992 | |
| GB | 2186992 | | 8/1987 | |
| GB | 2381326 | | 4/2003 | |
| GB | 2381326 | A * | 4/2003 | G02B 6/30 |
| JP | 05173038 | A * | 7/1993 | |
| JP | H05173038 | A | 7/1993 | |
| JP | 06247739 | A * | 9/1994 | |
| JP | 10182851 | A * | 7/1998 | |
| JP | 11337774 | A * | 12/1999 | |
| JP | 2004252290 | A * | 9/2004 | |
| JP | 2006222436 | A | 8/2006 | |
| JP | 2009502534 | A | 1/2009 | |
| JP | 2009145763 | A * | 7/2009 | |

OTHER PUBLICATIONS

Kostrzewa et al., "Die-to-Wafer molecular bonding for optical interconnects and packaging," EMPC 2005, Jun. 12-14, Brugge, Belgium, S4.01, pp. 118-123.

Office Action dated Apr. 11, 2016 in Korea Application No. 10-2015-7003074, 13 pages.

Office Action dated Sep. 25 in Taiwan Application No. 102123693, 12 pages.

Office Action dated Jan. 15, 2015 in Taiwan Application No. 102123693, 12 pages.

Written Opinion dated Aug. 18, 2015 in Singapore Application No. 11201500066R, 13 pages.

(56) References Cited

OTHER PUBLICATIONS

Office Action dated Dec. 1, 2015 in Japan Application No. 2015-520279, 5 pages.
Office Action dated Apr. 5, 2017 in Chinese application No. 201380040293.X, 16 pages.

* cited by examiner

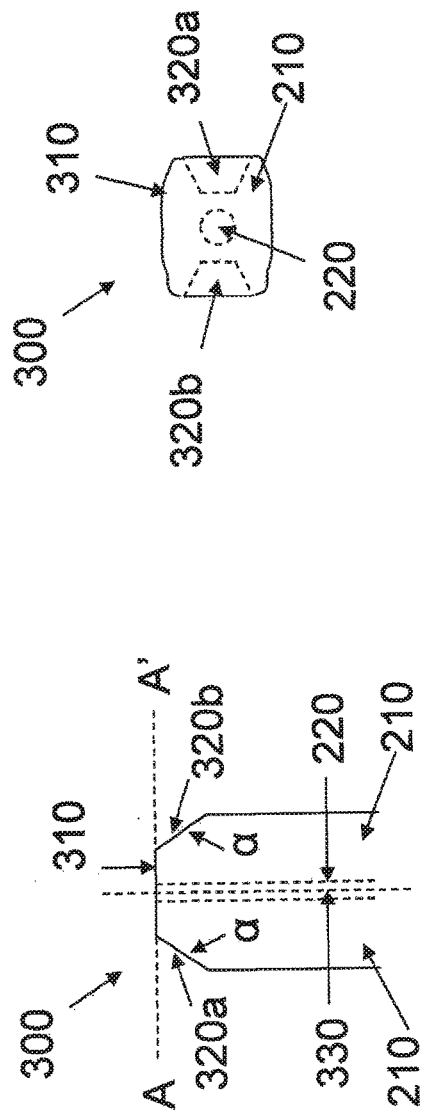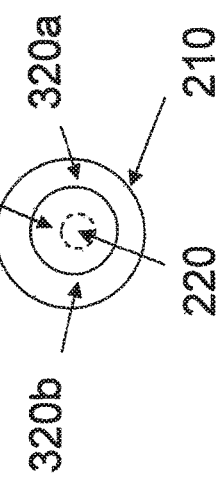
FIG. 3A
FIG. 3B
FIG. 3C

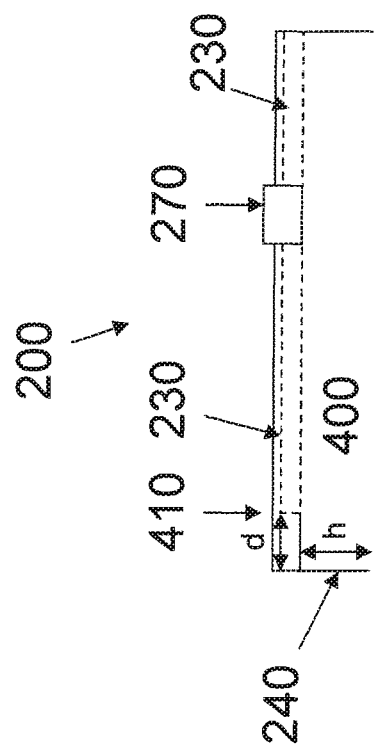
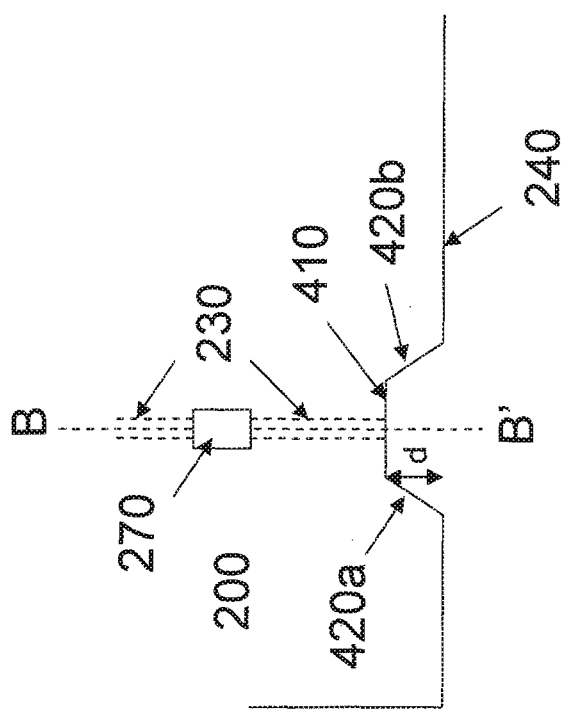
FIG. 4B
FIG. 4A

METHOD OF FORMING A HERMETICALLY SEALED FIBER TO CHIP CONNECTIONS

CROSS-REFERENCE TO RELATED APPLICATION(S)

This application is a divisional of U.S. application Ser. No. 13/543,156, filed Jul. 6, 2012, which is incorporated herein by reference in its entirety.

TECHNICAL FIELD

Embodiments of the invention relate to optical interconnects for chip-to-chip and intra-chip communication, and specifically directed to systems and methods of forming a hermetically sealed connection between an optical fiber and a silicon based photonic-integrated-chip.

BACKGROUND

Optical transmission may be used as a means for communication between separate integrated circuit chips (inter-chip connections) and within components on the same chip (intra-chip connections). In chip-to-chip communication via optical interconnects, each chip on the circuit board is interfaced with a transmitter-receiver optoelectronic chip, and the two optoelectronic chips are connected via a planar dielectric waveguide or optic fiber. Likewise, optical waveguides may be used to connect components within a chip, such as between an integrated optical source and a detector. An integrated optical waveguide is an optical path formed on or within a dielectric substrate, e.g., oxide coated silicon substrate, using lithographic processing. The waveguide can be made of an inorganic crystal or semiconductor material having a higher index of refraction than the chip substrate to guide optical signals along the waveguide.

The coupling of a single-mode fiber to an integrated optical waveguide (and vice versa) is one of the most expensive and time-consuming manufacturing processes in the packaging of semiconductor photonics. Various solutions to the coupling problem have been proposed including using a lateral inverted taper structure or a vertical diffractive grating structure.

Another challenge is to hermetically seal the fibers or wires connected to the photonic-integrated chip because the performance of photonic elements may be adversely affected by environmental conditions such as moisture and contaminants. Therefore, environmental isolation of the photonic elements in the chip is a design challenge. FIG. 1A shows a conventional photonic integrated chip package 100 connected to an optical fiber 110 through a feedthrough 120. Feedthrough 120 provides a hermetic seal between the fiber 110 and the chip package 100. FIG. 1B shows a cross-section diagram of the hermetic fiber feedthrough 120. The feedthrough 120 encases an end stripped portion 130 of the optical fiber 110. The end stripped portion 130 of the optical fiber 110 is surrounded by a glass solder 140 material, such as lead borate glass. The glass solder 140 is stacked between a glass sleeve 150 and the fiber 110 thereby forming a bond between the fiber 110 and the glass sleeve 150 that is largely free from porosity. The glass sleeve 150 is encased by a glass solder 160 material, such as lead borate glass, which in turn is surrounded by a outer sleeve 170. The outer sleeve 170 is made from metal, metallic alloy, ceramic, or glass. The end face 180 of the hermetically sealed fiber 110 is coupled to the photonic integrated chip package 100.

The conventional method described above however is costly and does not support high volume manufacturing. There is a need for an improved method to hermetically seal an optical fiber to a photonic-integrated chip. The method needs to be low cost and provide for a hermetically sealed connection with high reliability under extreme ambient conditions. In addition, the method needs to support high volume manufacturing processes and low processing temperatures.

BRIEF DESCRIPTION OF THE DRAWINGS

FIGS. 3A and 3B are top and cross-sectional views, respectively, of an optical fiber in accordance with a disclosed embodiment;

FIG. 3C is another cross-sectional view of an optical fiber in accordance with a disclosed embodiment;

FIGS. 4A and 4B are top and cross-sectional views, respectively, of a photonic-integrated chip in accordance with a disclosed embodiment.

DETAILED DESCRIPTION

In the following detailed description, reference is made to the accompanying drawings which form a part hereof, and in which is shown by way of illustration specific embodiments that may be practiced. It should be understood that like reference numbers represent like elements throughout the drawings. These embodiments are described in sufficient detail to enable those skilled in the art to make and use them, and it is to be understood that structural, material, electrical, and procedural changes may be made to the specific embodiments disclosed, only some of which are discussed in detail below.

Described herein is a method of preparing an optical fiber for coupling with, for example, a photonic-integrated chip. The method includes activating an end surface of the optical fiber in a plasma to generate dangling bonds on the end surface of the optical fiber, whereby the dangling bonds facilitate coupling with a surface of the photonic-integrated chip. Also described is an optical device manufacturing process that includes the steps of pre-activating an end surface of at least one optical fiber in a plasma generated from a gas specie containing oxygen, nitrogen, argon, hydrogen or ammonia and connecting the pre-activated end surface of the at least one optical fiber to, for example, a photonic-integrated chip. The disclosed methods can be used to manufacture an integrated optical device having a hermetically sealed fiber to chip connection.

Figure 1B:
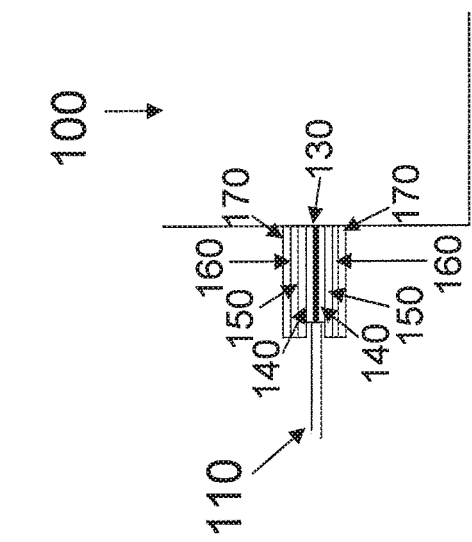
FIGS. 1A and 1B show a conventional hermetically sealed fiber to chip connection.
Figure 1A:
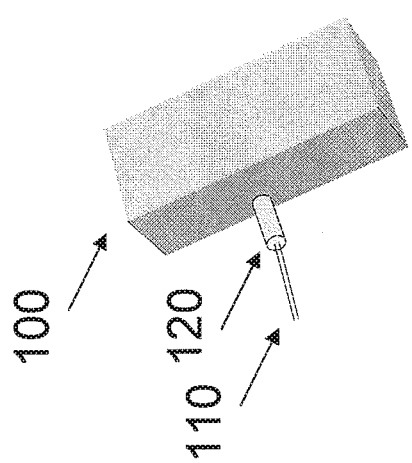
Figure 2:
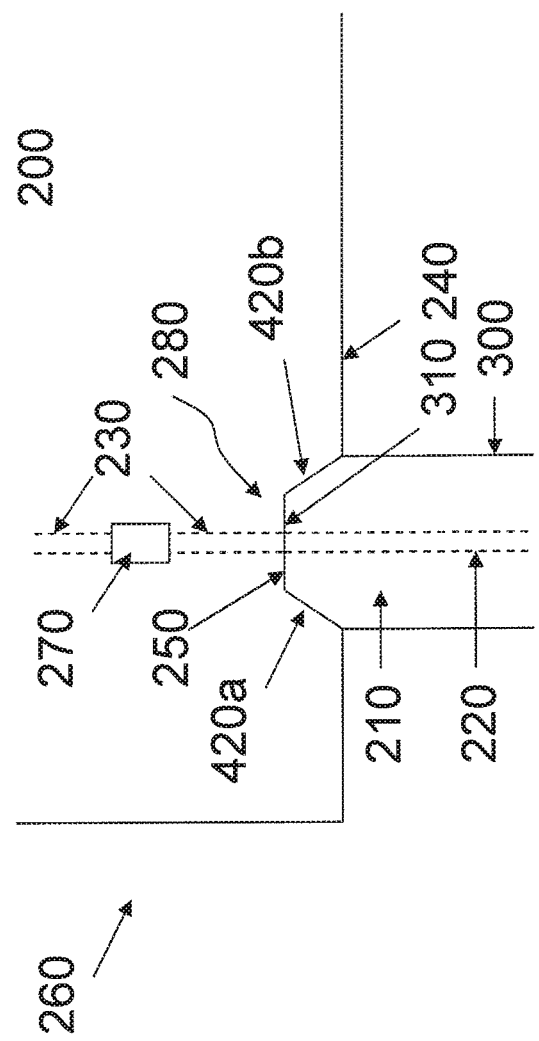
FIG. 2 is a top view of an optical device in accordance with a disclosed embodiment.

FIG. 2 is a top view of an optical device 260 in accordance with a disclosed embodiment. The optical device 260 has a photonic-integrated chip 200 coupled to an optical fiber assembly 300. The optical device 260 integrates multiple photonic functions on the photonic-integrated chip 200 using photonic elements 270 such as waveguides, optical amplifiers, modulators, filters, optical sources and detectors. The chip 200 has optical waveguides 230 that can be used to connect multiple photonic elements 270, such as between an integrated optical source and a detector, to each other. The optical waveguide 230 can also be used to connect a photonic element 270 to an optical fiber assembly 300 as shown in FIG. 2.

The optical device 260 has a hermetically sealed fiber to chip connection 250 located on a side surface 240 of the chip 200. A self-aligned mechanical interface 280 is used to help guide the fiber 300 to chip connection 250 using inverted taper coupling, although other known coupling mechanism can be utilized. As shown FIG. 2, for example, the self-aligned mechanical interface 280 located on the side surface 240 of the chip 200 is chamfered at 420a and 420b to mechanically align with a chamfered end surface 310 of the fiber assembly 300. Although FIG. 2 shows the fiber to chip connection 250 having a chamfered interface, it shall be appreciated that the fiber to chip connection 250 can be based on any suitable shape and configuration as long as the optical fiber assembly 300 can be aligned with and couple to the optical waveguide 230 on the chip 200 for optical communication.

FIG. 3A is a top view of the optical fiber assembly 300. The optical fiber assembly 300 can be a single-mode fiber having a core 220 surrounded by a cladding 210 material having a lower index of refraction than the core 220. In this embodiment, the core 220 is made of silica and germania and the cladding 210 is made of silicon dioxide. FIG. 3B shows a cross-sectional A-A' view of the optical fiber assembly 300. One end of the optical fiber assembly 300 has chamfered surfaces 320a, 320b. The chamfered surfaces 320a, 320b can have any angle a, for example, 45 degrees, measured with respect to the center axis 330 of the fiber core 220 as shown in FIG. 3A. The chamfered surfaces 320a, 320b can be annular as shown in FIG. 3C. Typically, any buffer and coating is stripped off of the end surface 310 and the chamfered surfaces 320a, 320b prior to connecting with the chip 200.

To ensure a good seal and adhesion between the fiber assembly 300 and the chip 200, the end surface 310 of the fiber assembly 300 is pre-activated in a plasma generated from oxygen or hydrogen containing gas species. Dangling bonds are generated on the end surface 310 of fiber assembly 300 when the silicon dioxide cladding 210 (FIG. 2) and silicon core 220 (FIG. 2) are activated in the plasma. The silicon atom requires four bonds to fully saturate its valence shell. In crystalline silicon, each silicon atom is bonded to four other silicon atoms. At the surface of the silicon core 220, however, the silicon atoms may have too few bonds to satisfy its valence shell. The surface 220 silicon atoms may be bonded to only three silicon atoms, leaving one unsatisfied valence bond, also known as a dangling bond. The surface of the silicon dioxide cladding 210 also has silicon atoms with unsatisfied valence bonds, or dangling bonds. In order to gain enough electrons to fill their valence, the silicon atoms with dangling bonds on the end surface 310 favor forming covalent bonds with silicon atoms that form at the side surface 240 (FIG. 2) of the optical waveguide 230 of the photonic-integrated chip 200. Pre-activation of the silicon dioxide and silicon end surface 310 in plasma to generate dangling bonds thus facilitate very robust bonding between the fiber assembly 300 and the photonic-integrated chip 200. The entire or a portion of the end surface 310 of the fiber assembly 300 can be pre-activated in the plasma The chamfered surfaces 320a, 320b can also be pre-activated ii). the plasma used to pre-activate the end surface 310 of the fiber assembly 300.

Other suitable gas species containing, for example, nitrogen, argon and ammonia, can be used to generate the plasma The plasma can be generated using any suitable process including, but not limited to, reactive ion etching plasma and microwave radicals generated from the gas species. Surface activation of the end surface 310 of the fiber assembly 300 prior to bonding the end surface 310 with the photonic-integrated chip 200 has the advantage that no intermediate layer, such as an adhesive, or step is needed to create a good seal and adhesion between the fiber assembly 300 and the chip 200.

FIG. 4A is a top view of the photonic-integrated chip 200. FIG. 4B shows a cross-sectional B-B' view of the photonic-integrated chip 200. The chip 200 includes an optical waveguide 230 formed on a dielectric substrate, e.g., oxide coated silicon substrate 400. The waveguide 230 connects a photonic element 270 (e.g., optical source, detector, etc.) to another photonic element or is aligned with an optical fiber 300 to guide optical signals from the input optical fiber 300 to the photonic elements on the chip. One side 240 of the chip 200 has chamfered surfaces 420a, 420b. The chamfered surfaces 420a, 420b have angles corresponding to the angle a of the chamfered surfaces 320a, 320b (FIG. 3A) on the fiber assembly 300 such that the pre- activated end surface 310 of the fiber assembly 300 aligns and couples to the surface 410 connecting the two chamfered surfaces 420a, 420b of the chip 200. The chamfered surfaces 420a, 420b have a height d measured from the surface 410 to the side surface 240 of the chip as shown in FIG. 4A.

FIG. 4B shows the silicon substrate 400 extends below the surface 410 where the fiber 300 couples to the chip 200. However, it shall be appreciated that the fiber 300 may extend below the silicon substrate 400 in the case, for example, where the silicon substrate 400 is a composite structure having a thickness h of about 50 µm and the diameter of the single mode fiber, such as SMF-28, is 125 µm.

The pre-activated end surface 310 of the fiber 300 forms a hermetically sealed connection 250 after any conventional method of assembling and alignment of the fiber 300 to the chip 200. Although FIGS. 4A and 4B show the optical fiber assembly 300 is aligned to the chip using inverted taper coupling, it shall be appreciated that the embodiment may be modified to use vertical taper coupling or any other suitable coupling of the fiber to chip. The hermetically sealed connection 250 exhibits excellent water-repellency. Standard low temperature annealing used for chip packaging flow, for example, at a temperature of at least 200° Celsius for at least two hours, can provide further improvements in hermetically sealing the fiber assembly 300 to the chip 200.

Although a good seal can be created from only pre-activating the end surface 310 of the fiber assembly 300, the surface 410 of the chip 200 can be pre-activated in plasma from a gas species containing oxygen, hydrogen, nitrogen, argon or ammonia, such as the plasma used to pre-activate the end surface 310 of the fiber assembly 300. The dangling bonds of the pre-activated surface 410 of the chip 200 generate even stronger covalent bonds with the pre-activated end surface 310 of the fiber assembly 300. The chamfered surfaces 420a, 420b of the chip 200 can also be pre-activated using the same plasma.

Figure 5:
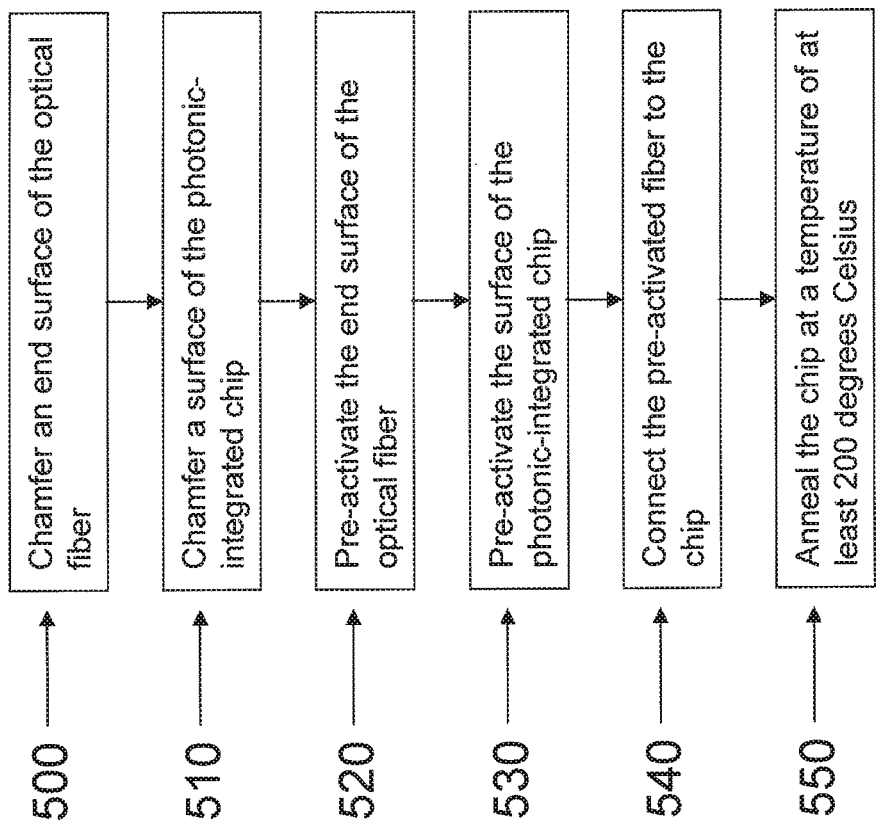
FIG. 5 is a flowchart of an integrated optical device manufacturing process in accordance with a disclosed embodiment.

FIG. 5 is a flowchart of an integrated optical device manufacturing process in accordance with a disclosed embodiment. The process shown hermetically seals at least one input optical fiber to a surface of a photonic-integrated chip. At step 500 of the process, the end surface 310 of the optical fiber 300 that will be coupled to the chip 200 is chamfered as shown in FIGS. 3A and 3B, for example. At step 510, the surface of the chip 200 that will be hermetically connected to the fiber 300 is chamfered as shown in FIGS.

4A and 4B, for example. At step 520, the end surface 310 of the fiber 300 is pre-activated in a plasma to generate dangling bonds (or free silicon bonds) on the end surface 310. If multiple fibers 300 are to be coupled to the chip 200 in batch processing, then the end surfaces 310 of the plurality of fibers 300 may be simultaneously pre-activated in the plasma. The pre-activated end surfaces 310 are connected to the corresponding surfaces 410 on the chip 200. The connection step should occur within a predetermined time, such as within two hours of the pre-activating step, to ensure the fiber remains pre-activated. To speed up the bonding process, at step 530, the surface 410 of the chip 200 may also be pre-activated in the plasma to generate dangling bonds on the surface 410 of the chip 200. The pre-activation of the chip surface 410 may occur before, after or simultaneous with the pre-activation of the fiber 300. At step 540, the pre-activated fiber 300 is connected to the chip 200 as shown in FIG. 2. Pressure at, for example, 1.5 MPa may be applied to ensure no gaps form between the fiber 300 and the chip 200. At step 550, after the fiber 300 is connected to the chip 200, the chip 200 can be annealed at a temperature of at least 200 degrees. Celsius to further augment the sealing of the fiber to the chip.

While disclosed embodiments have been described in detail, it should be readily understood that the invention is not limited to the disclosed embodiments. Rather the disclosed embodiments can be modified to incorporate any number of variations, alterations, substitutions or equivalent arrangements not heretofore described.

We claim:

1. An optical device, comprising:
a photonic-integrated chip on which an optical waveguide is formed, the photonic-integrated chip having a surface with a flat base surface and a chamfered surface adjacent to the base surface; and
an optical fiber assembly comprising an optical fiber having a flat terminating end surface and an adjacent chamfered surface, wherein the terminating end surface and the chamfered surface of the optical fiber are pre-activated in a plasma to create dangling bonds on the terminating end surface and the chamfered surface of the optical fiber which facilitate coupling with the optical waveguide,
wherein the terminating end surface of the optical fiber directly contacts the base surface of the photonic-integrated chip and the chamfered surface of the optical fiber matches and aligns with the chamfered surface of the photonic-integrated chip, thereby providing a hermetically sealed optical connection between the optical fiber and the optical waveguide formed in the photonic-integrated chip.

2. The optical device of claim 1, wherein the optical fiber is connected to the optical waveguide using an inverted taper.

3. The optical device of claim 1, wherein the chamfered surface of the photonic-integrated chip is pre-activated in the plasma.

4. The optical device of claim 1, wherein the terminating end surface of the optical fiber is coupled to the base surface of the chip such that there are no gaps between the optical fiber and the chip.

5. The optical device of claim 1, wherein the plasma is generated from a gas species containing at least one of: oxygen, hydrogen, nitrogen, ammonia, and argon.

6. The optical device of claim 1, wherein the optical chip comprises an optical waveguide, and wherein the optical chip is coupled to the optical fiber such that the optical fiber forms at least one covalent bond directly with the optical waveguide.

7. The optical device of claim 6, wherein the at least one covalent bond is a silicon-to-silicon covalent bond.

8. An optical device, comprising:
an optical fiber having a flat terminating end surface and an adjacent chamfered surface;
an optical chip having a surface with a flat base surface and a chamfered surface adjacent to the base surface,
wherein the optical fiber is coupled to the optical chip such that the terminating end surface of the optical fiber is connected to the base surface of the chip and the chamfered surface of the optical fiber matches and aligns with the chamfered surface of the optical chip,
wherein the optical fiber is pre-activated in a plasma to create dangling bonds on the terminating end surface and the chamfered surface of the optical fiber, and wherein the optical fiber forms at least one covalent bond directly with the optical chip.

9. The optical device of claim 8, wherein the terminating end surface of the optical fiber and the adjacent chamfered surface include dangling bonds on the terminating end surface.

10. The optical device of claim 8, wherein there are no gaps between the optical fiber and the chip surface.

11. The optical device of claim 8, wherein the optical fiber and the chip surface form a hermetic seal.

12. The optical device of claim 8, wherein the optical chip comprises an optical waveguide, and wherein the optical fiber forms at least one covalent bond directly with the optical waveguide.

13. The optical device of claim 12, wherein the optical chip is coupled to the optical fiber such that the optical fiber forms a hermetic seal with the optical waveguide.

14. The optical device of claim 12, wherein the at least one covalent bond is a silicon-to-silicon covalent bond.

* * * * *